APPARATUS FOR SEALING AND SEVERING PARISONS

Filed Aug. 1, 1966

INVENTOR
W. G. KINSLOW, JR.
BY Young & Greigg
ATTORNEYS

INVENTOR
W. G. KINSLOW, JR.

BY Young & Quigg
ATTORNEYS

INVENTOR
W. G. KINSLOW, JR.

BY Young & Quigg

ATTORNEYS

APPARATUS FOR SEALING AND SEVERING PARISONS

Filed Aug. 1, 1966

INVENTOR
W. G. KINSLOW, JR.

BY

Young & Craig

ATTORNEYS 3,430,290
Patented Mar. 4, 1969

3,430,290

APPARATUS FOR SEALING AND SEVERING PARISONS

William G. Kinslow, Jr., Bartlesville, Okla., assignor to Phillips Petroleum Company, a corporation of Delaware Filed Aug. 1, 1966, Ser. No. 569,335
U.S. Cl. 18—5 7 Claims
Int. Cl. B26d *5/16;* B29c *17/07*

ABSTRACT OF THE DISCLOSURE

Heat softened hollow plastic parisons are closed at one end, preparatory to blow molding, by means of at least two pointed cooperating closing elements which have leading edges disposed adjacent their flat upper faces. These elements slope back from the leading operative edges toward the upper face and toward a bottom face. The surface sloping from the leading edge toward said upper face is tapered or chamfered in an angle of less than 90° included angle of the horizontal, that is with respect to the upper face of the blade.

Figure 1:
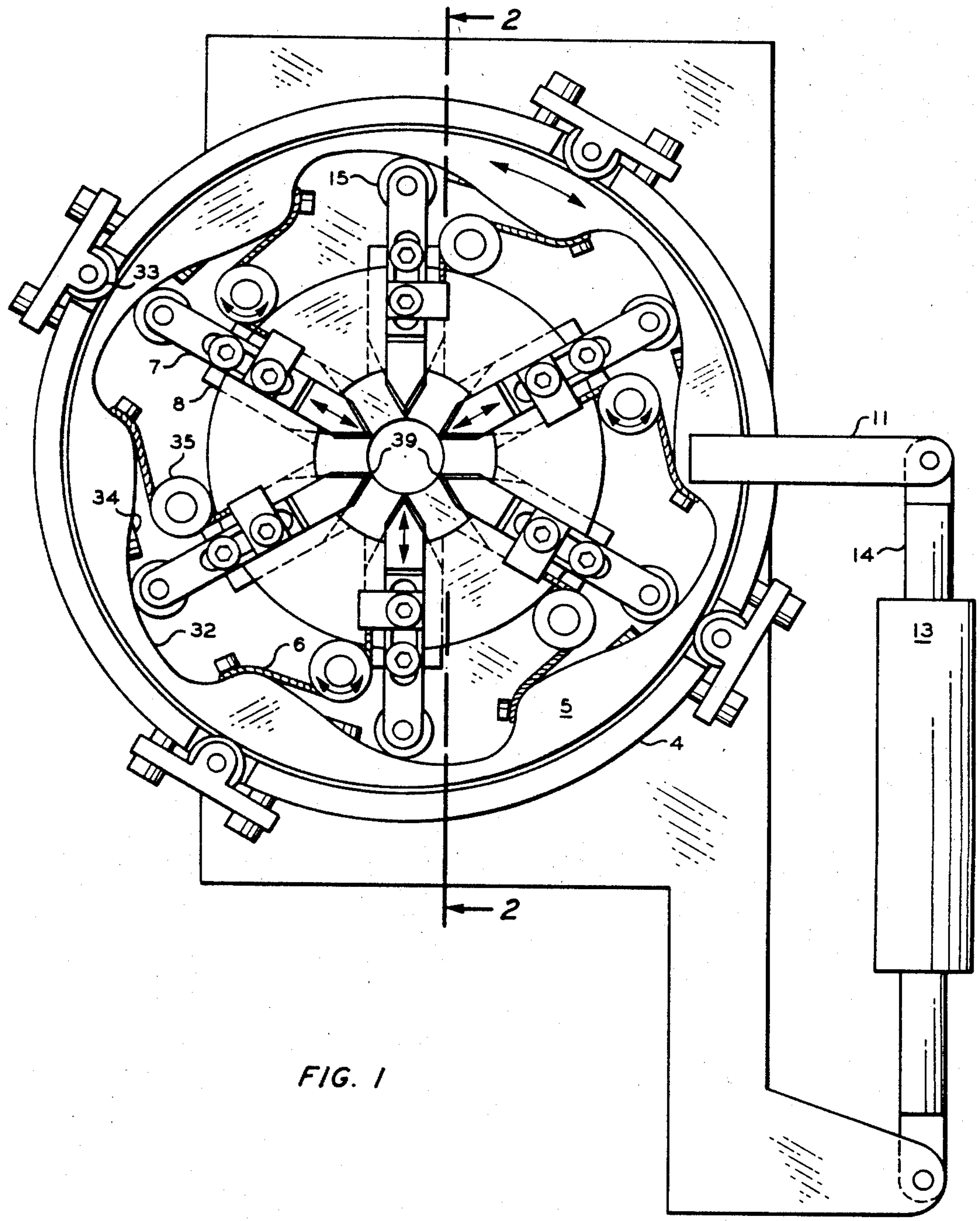

This invention relates to an apparatus for closing hollow parisons to be blow molded. In one aspect, hollow parisons are closed by forcing the side walls together into sealed contact by means of coacting closing elements being slightly chamfered on the article side. In another aspect, there is provided a parison closing means comprising at least two coacting closing elements having surfaces facing a supported parison to be closed which are chamfered or tapered at an angle of less than 90° to the axis of said parison.

Apparatus for closing and sealing the open ends of parisons and severing the same in predetermined lengths from preformed sections or lengths of tubular parison material of numerous varieties are well known in the art. There are several general forms of this type of apparatus employed to sever, close, and/or seal preformed parison material to be blow molded. Most of the apparatus employed to perform this function comprises at least two blades, one of which may be stationary, which are designed to coact and close the side walls of the parison into sealed relationship. In some applications, a more preferred type of apparatus is that consisting of several radially mounted cutting and/or sealing elements operated by a cam plate, hydraulic or other similar apparatus in combination with suitable retrieval means all of which are adapted to effect the coaction of the several radially mounted elements to converge on the several sides of the parison to close the finished parison to be molded and to sever it from the remaining length of preformed parison material. However, due to the nature of the design of the sealing elements in such apparatus, the parison material, whether it be thermoplastic, glass or other similar semifluid material, is stretched and substantially thinned out in the vicinity of the seal. As a result, that part of the finished molded article that is in the vicinity of the seal is generally thinner and weaker than the remaining parts of the finished article. I have found that this problem can be substantially eliminated by slightly tapering or chamfering the face of the closing elements on the side toward the finished article so as to provide an angle of less than 90° between the chamfered or tapered face and the axis of the closed parison.

It is therefore one object of this invention to provide an apparatus for closing and sealing parisons to be molded which provides a seal of improved strength. It is another object of this invention to provide an apparatus for closing tubular parisons which substantially minimizes the problem of reduction in material thickness at the point of the seal. It is a further object of this invention to provide apparatus for sealing and severing a thermoplastic parison which is at a temperature below the optimum sealing temperature of the thermoplastic.

Other aspects, objects and advantages of this invention will be apparent to one skilled in the art in view of the disclosure, the drawings and the appended claims.

According to the invention, supported tubular parison material is closed at its open end by an apparatus comprising at least two coacting closing and/or sealing elements designed to converge on the side walls of the tubular parison forcing them together to effect seal and separation of the finished parison to be blow molded from a length of pre-formed parison material, the faces of the closing elements being slightly chamfered or tapered on the side facing the finished parison to direct parison material into the vicinity of the seal in order to increase the thickness of material in the vicinity of the seal and consequently increase the strength thereof.

In a presently preferred embodiment of this invention, several closing elements having one surface tapered on the finished article side as described above are radially mounted and adapted to coact and converge simultaneously on the side walls of a tubular parison, the axis of which is situated at the point of convergence of the several closing elements which can be operated by cam, hydraulic, or other suitable means.

The invention can best be understood by reference to the accompanying drawings which are illustrative of the application of the concept of this invention to one particular embodiment.

Figure 2:
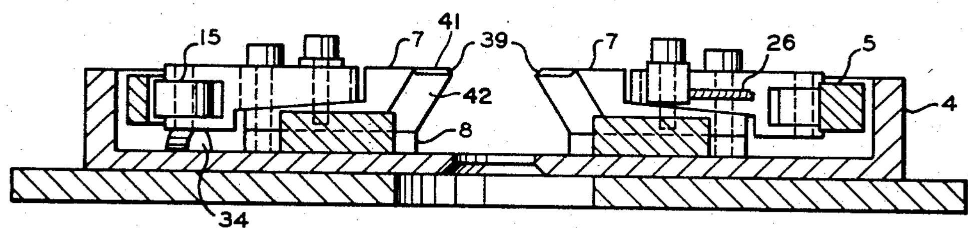
Figure 3:
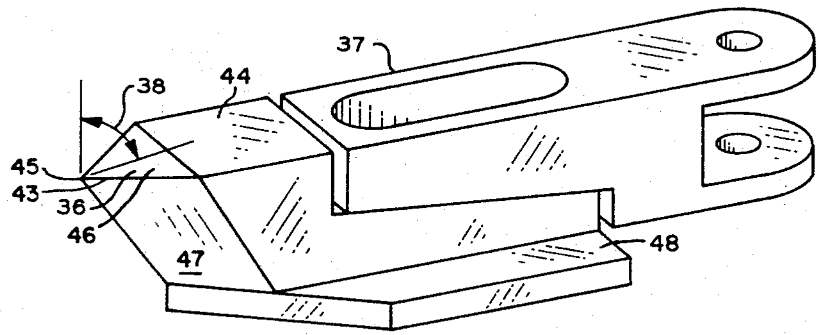
Figure 4A:
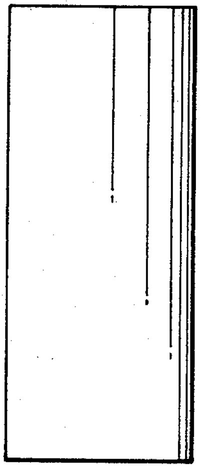
Figure 5A:
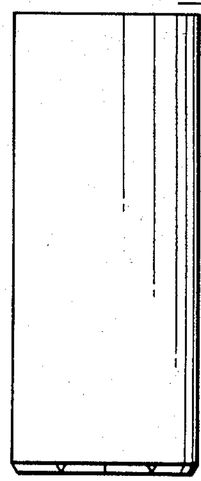
Figure 4B:
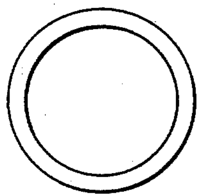
Figure 5B:
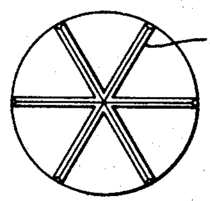
Figure 6A:
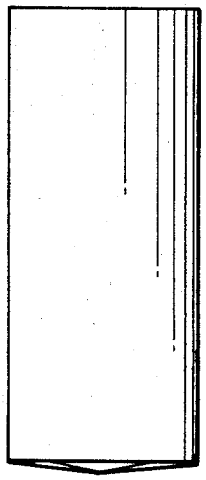
Figure 6B:
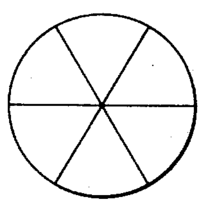
Figure 7:
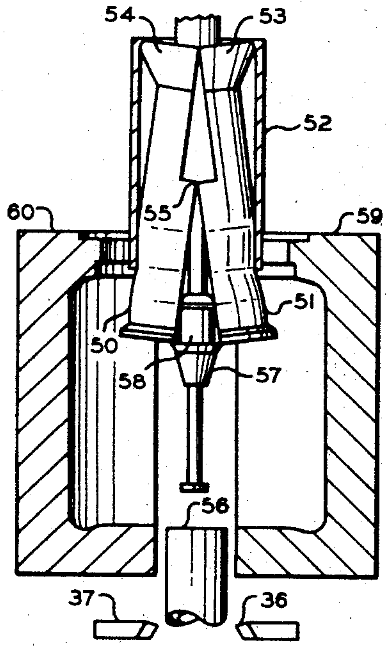
Figure 9:
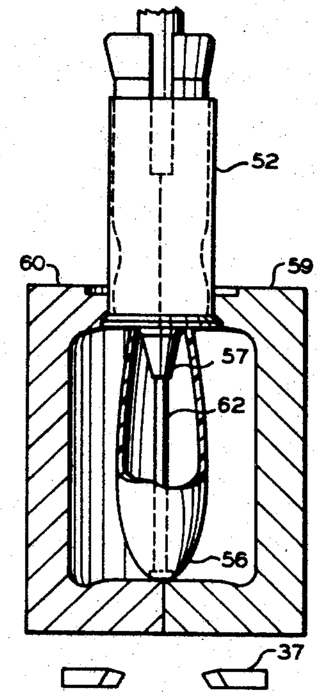
Figure 8:
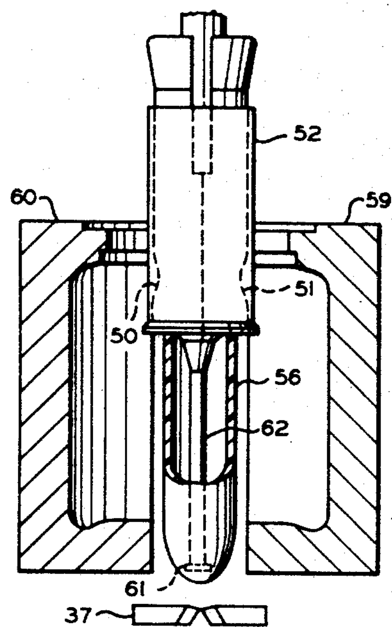

FIGURE 1 shows a top view of the radially mounted closing and sealing elements with cam plate and followers. FIGURE 2 shows a cross-section of the apparatus of FIGURE 1 along cut II—II. FIGURE 3 shows the top and side view of a single closing and sealing element with a tapered surface. FIGURE 4*a* shows a side view of a tubular parison before it is severed and sealed. FIGURE 4*b* shows the end view of the parison of FIGURE 4*a*. FIGURE 5*a* shows a side view of a tubular parison having been closed and sealed by apparatus employing six-chamfered closing elements. FIGURE 5*b* shows the end view of the parison of FIGURE 5*a*. FIGURE 6*a* shows a side view of a parison having been severed and closed by six radially spaced tapered closing elements. FIGURE 6*b* shows the end view of the parison of FIGURE 6*a*. FIGURE 7 shows a blow molding apparatus in combination with the parison closing apparatus of this invention. FIGURE 8 shows suitable blow molding apparatus in combination with the parison closing apparatus of this invention, following the closure of the parison. FIGURE 9 shows the molding apparatus of FIGURE 8 following the closure of the mold halves and prior to the blowing step.

Referring now to the drawings, FIGURE 1 illustrates a presently preferred embodiment of this invention comprising six radially spaced closing and sealing elements 7 and their respective slides 8. Each of the closing elements of this embodiment are defined at their operating extermity by a 60° included angle and have at their other extremity cam followers 15 which, in following cam surface 32, effect the radial displacement of closing members 7 in response to the rotation of cam plate 5 as governed by the operation of pneumatic or hydraulic cylinder 13 operating through linkages 14 and 11. As shown in FIGURE 2, a plurality of operating elements 7 are mounted in slides 8 and are thereby radially movably attached to support housing 4 in which cam plate 5 rotates. Cam plate 5 is rotatably mounted in support housing 4 by means of suitable bearings 33 and 34, the operating elements 7 are forced inwardly to coact with each other by virtue of counterclockwise rotation of the cam plate and are retrieved to open position by clockwise rotation of the cam plate due to the operation of the several cables 26 operating over suitable rollers 35 rotatably mounted on the support housing. The apparatus further comprises stationary supports and accessory features.

As shown in FIGURES 1 and 2 at 39, the several radially operated closing elements are slightly chamfered at their operating edges by an angle of from about 65 to about 80° included angle of the horizontal, i.e., wi.h respect to the flat upper face 41 of blades 7 as illustrated in FIGURE 2. A second surface 42 slopes back toward a bottom face which is mounted on slide 8. However, in the presently preferred embodiment of this invention, the angle of chamfer as illustrated in FIGURES 1 and 2 is desirably maintained within the range of from about 70 to about 75°.

In an alternate embodiment, the closing elements 7, rather than being chamfered on their leading edges can be slightly tapered as illustrated in FIGURE 3 to give leading edges 43 adjacent flat upper face 44, said leading edges coming to a point 45 in which are illustrated the top and side views of a suitable closing element in accordance wi:h this embodiment. First surface 46 slopes back toward upper face 44 and second surface 47 slopes back toward a lower face of element 37, said lower face being mounted to slide 48. The operating surface of blades 37 facing the finished sealed parison are slightly tapered at 36 to present an angle 38 of less than 90° and preferably within the range of from about 70 to about 85° to the axis of the supported parison.

The side and end views of a typical tubular parison before the severed end is closed are illustrated in FIGURE *4a* and FIGURE *4b*. The parisons are generally employed in blow molding or vacuum molding operations in which the parison generally comprises a heat softenable material such as glass, plastic or metal. As described above, additional parison material is forced into the area of this seal in the form of ridges 40 as illustrated in side and end views of the closed parison in FIGURE *5a* and FIGURE *5b*. During the molding operation, the additional material in these ridges is distributed substantially uniformly throughout the vicinity of the seal, thereby providing a more durable finished product.

The problem which the tapered and chamfered blades of this invention are intended to remedy derives from the fact that the optimum blowing temperatures of thermoplastic articles, particularly oriented thermoplastic articles, are lower than the optimum sealing temperature of the thermoplastic. Consequently, a temperature compromise is required in these operations in order to achieve a strong seal while maintaining the desired qualities of the finished product. For example, I have found that in a particular application employing polypropylene parisons for the fabrication by blow molding of bottles that the parison temperature is desirably maintained within ±2° F. in order to obtain a strengthened seal while maintaining the desired product characteristics. In a particular test operation wherein polypropylene was used to fabricate 10 ounce test bottles by blow molding, the ordinary untapered or unchamfered blades provided a seal thickness of about 3/64 inch in the center of the pinch-off area as compared to a thickness of about 5/64 inch at the same point which was obtained by the use of the blades of this invention.

Although the chamfered blades as above described are suitable for effecting the strengthening of the parison and finished article in accordance with the objects and the concept of this invention, it is presently preferred in some applications to employ the alternate embodiment as described and illustrated in FIGURE 3 above wherein the clsoing elements, rather than being chamfered are tapered on their leading edges in order to force or direct additional parison material into the vicinity of the seal in a manner similar to that accomplished by the chamfered closing elements. One advantage of the tapered blades is that prominent ridges are not formed in the vicinity of the seal and is the case where the closing elements are chamfered. On the contrary, the parison surface in the vicinity of the seal is substantially uniform as illustrated in FIGURE *6a* and FIGURE *6b*, wherein are presented side and end views of a parison having been closed with tapered elements as above described. The thickness of the parison material in the vicinty of the seal is indicated by the degree of shading, the shading being heavier where the thickness is greater.

However, the chamfered blades are presently preferred in most applications where the appearance of the bottom seal is not a determining factor in that the wear characteristics of the chamfered blades as compared to the durability of a regular or tapered blade is much superior. The chamfered blades resist dulling of the knife edges due to their inherent design. Unmodified blades, however, when out of adjustment only slightly due to wear or during dry runs, tend to ride up on one another which quickly results in edge dulling and/or nicking. For example, in certain applications, the unmodified blades have been observed to last from about two days to three weeks in service, while in the same service the chamfered blades have resisted edge dulling, etc., for periods as long as six months.

The coordination of the parison closing and sealing apparatus of this invention and a conventional blow molding apparatus is illustrated in FIGURES 7 and 8. This particular molding apparatus is more completely described in copending application Ser. No. 489,934, now Patent No. 3,390,426, by Fred E. Wiley and Edward W. Turner.

In operation, the movable jaws 50 and 51 in FIGURE 7 are extended downwardly to the lowermost position as shown in FIGURE 7 by suitable hydraulic, pneumatic or mechanical means. Cam tube 52 is moved upwardly by suitable mechanical means with respect to movable members 50 and 51 which action produces inward and upward pressure against extremities 53 and 54 of movable members 50 and 51, thus pivoting these members about point 55 so that their lower extremities will diverge and their upper extremities will converge. The parison 56 is then inserted into position over guide tip 57 and compression ring 58. Cam tube 52 is then moved downward over movable elements 50 and 51 to effect closing of the lower extremities of those elements around the parison, thereby gripping it.

During this operation, the parison is passed between the several closing and sealing elements 37 so that in the supported position, the axis of the parison is located at the point of convergence of the closing and sealing elements. These elements are situated with respect to the lowermost extension of movable gripping members 50 and 51 so that the axial dimension of the sealed parison conforms to a predetermined length as dictated by the dimensions of the movable mold halves 59 and 60. Rod 62 having at its lower extremity foot 61 can then be extended downwardly to perfect the point of the seal at the lower end of the parison. The complete parison gripping assembly is then retrieved upwardly into molding position, at which time mold halves 59 and 60 are closed about the parison and gripping assembly as illustrated in FIGURE 9 and air at superatmospheric pressure is injected into the interior of the parison to form the side walls thereof into confirmation wi:h the interior of the mold. The thus molded article is then cooled and removed from the molding assembly after which time the above described cycle is repeated.

Reasonable variation and modification of this invention will be apparent to one skilled in the art in view of the foregoing disclosure, drawing and the appended claims to this invention, the essence of which is that there is provided an apparatus for closing and sealing one end of a heat softened parison, which apparatus comprises coacting closing and sealing elements movably mounted to converge on the side walls of the parison forcing them together into sealed relationship, the surfaces of the closing elements facing the closed parison being tapered at an angle of less than 90° to the axis of said parison.

I claim:

1. Apparatus for sealing and severing at the open end of a hollow parison of heat softened material to be blow molded, which apparatus comprises:

a plurality of radially operated, pointed, cooperating elements, each of which has a flat, upper face and a lower face;

said elements having leading edges disposed adjacent said upper face, which leading edges of said plurality of elements coact to close one end of said parison;

each of said elements having first and second surfaces sloping back from its leading edge toward said upper and lower faces, respectively;

said first surface, sloping toward said upper face, being tapered at an angle of 70–85° to the axis of said closed supported parison.

2. Apparatus according to claim 1, comprising in addition:

means to support said parison above said closing elements to present a substantially vertical axis and means to actuate said closing elements in a direction perpendicular to said vertical axis.

3. Apparatus according to claim 1, comprising in addition:

a support housing in which said closing elements are radially movably mounted, actuating means for moving said closing elements relatively radially inward to engage said parison and to effect the coaction of said elements, and means for moving said closing elements relatively radially outward to disengage said closing elements.

4. Apparatus for closing an open end of a hollow parison of heat softened material to be blow molded, which apparatus comprises:

a plurality of radially operated, pointed, cooperating elements, each of which has a flat upper face and a lower face;

said elements having leading edges disposed adjacent said upper face, which leading edges of said plurality of elements coact to close one end of said parison, each of said elements having first and second surfaces sloping back from its leading edge toward said upper and lower faces, respectively;

said first surface, sloping toward said upper face, being chamfered at an angle of from 65–80° included angle of the horizontal.

5. Apparatus according to claim 4, comprising in addition:

means to support said parison above said closing elements to present a substantially vertical axis and means to actuate said closing elements in a direction perpendicular to said vertical axis.

6. Apparatus according to claim 4 comprising in addition:

a support housing in which said closing elements are radially movably mounted, actuating means for moving said closing elements relatively radially inwardly to engage said parison and to effect the coaction of said elements, and means for moving said closing elements relatively radially outward to disengage said closing elements.

7. Apparatus according to claim 4 wherein said angle is from 70–75°.

References Cited

UNITED STATES PATENTS

| | | | |
|---|---|---|---|
| 1,134,763 | 4/1915 | Schaub | 83—628 |
| 1,981,059 | 11/1934 | Matthews et al. | 83—628 |
| 2,503,171 | 4/1950 | Power. | |
| 2,733,458 | 2/1956 | Trurnit | 10—153 |
| 2,940,121 | 6/1960 | Sherman. | |
| 3,001,239 | 9/1961 | Santelli et al. | |

WILBUR L. McBAY, *Primary Examiner.*

U.S. Cl. X.R.

65—87, 174; 83—54, 628